United States Patent [19]

Nakao

[11] 4,236,423
[45] Dec. 2, 1980

[54] OPERATION MECHANISM FOR TAPE RECORDER

[75] Inventor: Toshihiro Nakao, Hachioji, Japan

[73] Assignee: Olympus Optical Co., Ltd., Tokyo, Japan

[21] Appl. No.: 945,847

[22] Filed: Sep. 26, 1978

[30] Foreign Application Priority Data

Sep. 28, 1977 [JP] Japan .......................... 52/130022[U]

[51] Int. Cl.³ ...................... G05G 1/02; G11B 15/18; G05G 5/08
[52] U.S. Cl. .............................. 74/483 PB; 74/10.27; 360/137
[58] Field of Search ................. 74/10.27, 483 PB, 503; 360/137

[56] References Cited

U.S. PATENT DOCUMENTS

| 3,416,388 | 12/1968 | Piotrowski | 74/483 PB |
| 4,081,849 | 3/1978 | Onishi et al. | 74/483 PB |
| 4,116,078 | 9/1978 | Kitamura et al. | 74/10.27 |

Primary Examiner—Allan D. Herrmann
Attorney, Agent, or Firm—Toren, McGeady and Stanger

[57] ABSTRACT

An operation mechanism for a tape recorder comprises a recording operation member, a reproduction operation member provided near the recording operation member, a stop operation member for releasing the operational state of these operation members, and an engaging member acted in the direction orthogonal to the acting direction of these operation members, whereby an additional or following recording is made possible by operating the recording operation member under the reproduction operation state.

3 Claims, 4 Drawing Figures

OPERATION MECHANISM FOR TAPE RECORDER

BACKGROUND OF THE INVENTION

The present invention relates to an operation mechanism for a tape recorder which can make additional or following recording under the reproduction operation state.

Hitherto, even if the tape recorder is operated by mistakenly pressing a recording operation button during reproduction, it does not turn to the recording operation state, i.e., the already recorded content is not erroneously erased.

Together with spread of a microcassette (trade name), various kinds of superminiature tape recorder have been developed and particularly popular as a dictaphone. From the use thereof, these superminiature tape recorders are required to be improved in such a manner that the insufficient dictation or unnecessary passage is corrected or erased as the tape is reproduced, i.e., additional or following recording can be effected.

SUMMARY OF THE INVENTION

An object of the present invention is to satisfy the above requirement.

Another object of the present invention is to provide an operation mechanism for a tape recorder having such a simple construction that the following or additional recording becomes possible during reproduction and no following or additional recording during misoperation.

According to the present invention an operation mechanism for a tape recorder comprises a recording operation member, a reproduction operation member provided near the recording operation member, a stop operation member for releasing the operational state of these operation members, and an engaging member acted in the direction orthogonal to the acting direction of these operation members, whereby an additional or following recording is made possible by operating the recording operation member under the reproduction operation state.

DESCRIPTION OF THE PREFERRED EMBODIMENT

Figure 1:
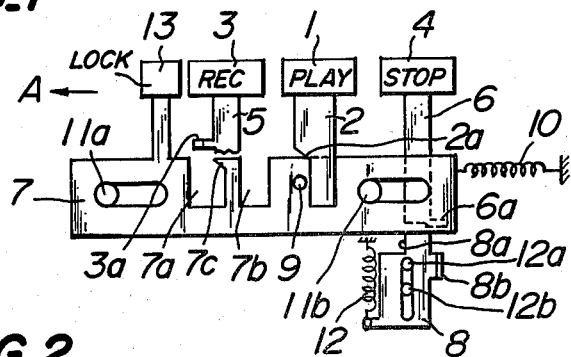
FIG. 1 is a schematic plan view showing the stop state position of an operation mechanism for tape recorder according to the present invention.

Referring to FIGS. 1 to 4 one embodiment of an operation mechanism for a tape recorder according to the present invention will be explained. In FIG. 1, a reproduction or playing operation member 2 having a playing or reproduction operation button 1 drives a lever (not shown) provided with a recording head, pinch roller and the like thereon. A recording operation button 3 and a stop operation button 4 provided on both sides of the reproduction operation button 1 are secured to operation members 5, 6, respectively. The recording operation member 5 cooperates with the reproduction operation member 2 at the time of operation and brings an erasing head (not shown) to the operation position. The stop operation member 5 restores the recording and reproduction operation members 2, 5 from the operation position to the stop position and controls a stopper 8 of the engaging member 7, which will be explained later on.

That is, the engaging member 7 is engaged with an inclined surface 2a of the reproduction operation member 2 and provided with a pin 9 for being moved in the direction of an arrow A during operation.

The above engaging member 7 is further provided with a pair of recesses 7a, 7b for separating an engaging piece 3a provided in the recording operation member 3 from the engaging member 7 at the stop position or the following (additional) recording position, and an engaging portion 7c is provided between these recesses 7a, 7b so as to make it into contact with the engagng piece 3a at the reproduction position.

To the engaging member 7 is fixed a lock button 13 adjacent to the recording operation button 3, and this button 13 is operated in the direction of an arrow A against a spring 10.

In addition, reference numerals 11a, 11b are guide pins for linearly moving the engaging member 7 in the direction of an arrow A.

On the other hand, the stopper 8 is provided with an engaging step portion 8a for engaging with the engaging member 7 when moving to the position where the following recording is possible, and further provided with a release arm 8b, and this release arm 8b is pressed with a pressure piece 6a of the stop operation member 6 against the spring.

In addition, reference numerals 12a, 12b are guide pins of the stopper 8.

Figure 2:
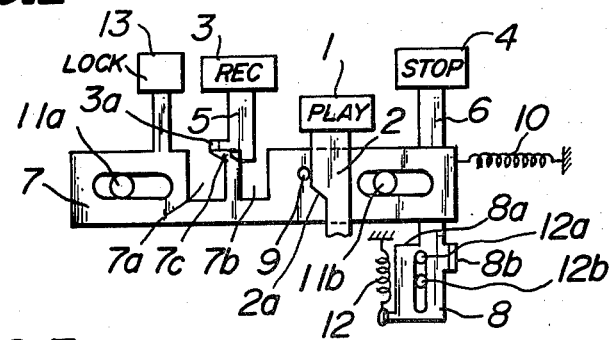
FIG. 2 is a schematic plan view showing the reproduction or playing state position of the operation mechanism.

In the operation mechanism for the tape recorder thus constructed, when the reproduction operation button 1 is pressed from the stop state shown in FIG. 1, the pin 9 is pressed with the inclined surface 2a of the operation member 2, so that the engaging member 7 is set to the reproduction state shown in FIG. 2. In this case, the reproduction operation member 2 is maintained at the operation state by a lock member (not shown) and performs the usual reproduction action.

Under the above reproduction state, the recording operation button 3 cannot be pressed because the engaging piece 3a is made into contact with the engaging portion 7c, and as a result, even if the recording button is erroneously pressed during the reproduction operation, there is no possibility of erasing the tape.

Figure 3:
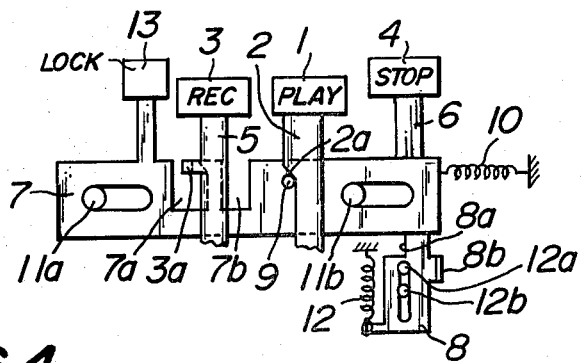
FIG. 3 is a schematic plan view showing the recording enable state position of the operation mechanism.

The process of moving from the stop state to the recording position is explained. As shown in FIG. 3, the recording operation button 3 and the reproduction operation button 1 are simultaneously pressed, so that in case of starting to press the pin 9 with the inclined surface 2a of the reproduction operation member 2, the engaging piece 3a is within the recess 7a and the recording state is obtained without being prevented by the engaging portion 7c.

Even in a recent tape recorder which can set the recording state by only operating the recording button, the recording operation member enters into the recess and can be set in the same manner.

Figure 4:
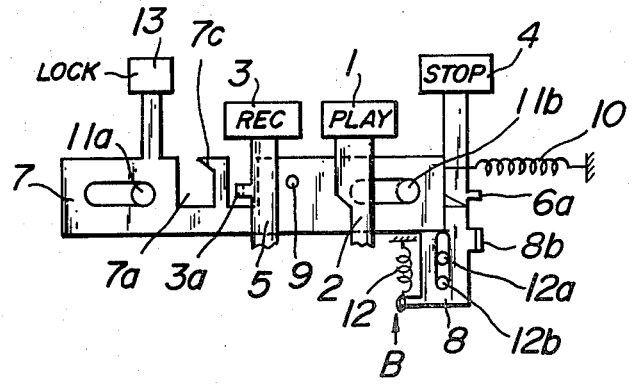
FIG. 4 is a schematic plan view showing the following or additional recording state position of the operation mechanism.

On the other hand, in case of following recording, as shown in FIG. 4, if a lock button 13 is pressed in the direction A against the spring 10, the engaging member 7 is moved and the stopper 8 by the engaging member 7 is released from the engaging state, so that the stopper 8 is raised in the direction B by the action of the spring 12, engaged with the engaging member 7 at the engaging step portion 8a and set the engaging member 7 at the following or additional recording possible position.

Thereafter, at the following or additional recording possible position, the recording operation button 3 is positioned to enter into the recess 7b, so that the recording operation and the reproduction operation buttons can be pressed any time, if necessary.

That is, when the recorded content or the like is immediately reproduced and any unnecessary passage is found, and when this unnecessary passage is recorded, the recording operation button 3 is pressed, necessary matters are dictated and unnecessary passage is rerecorded.

Thus, the portion which contains unnecessary passage in the recorded tape is reproduced and corrected. In case of the so-called additional or following recording, the engaging member is simply operated to a predetermined position.

Further, in case of releasing the following or additional recording, the stop operation member 4 is pressed, whereby the release arm 8b of the stopper 8 is pressed by the pressure piece 6a, the stopper is pressed down against the spring 12, the engaging step portion 8a is disengaged, and the engaging member 7 is restored to the orginal stop position, and the tape recorder performs the usual action thereafter.

The following or additional recording can be carried out, if necessary, by repeating the above operation. Even if the recording operation button is pressure during the usual reproduction operation, the tape recorder is not actuated and the tape is not erroneously erased.

The present invention is not limited to the above embodiment but in case of operating a lock button without providing any stopper, the state can be maintained as it is by hand, and the following or additional recording can be made under the same state, so that it is impossible to forget the following or additional recording possible position.

As described above in detail, the present invention can perform the following or additional recording with a simple construction and can prevent erroneous erasing even during the usual reproduction operation.

What is claimed is:

1. An operation mechanism for a tape recorder comprising a recording operation member for placing the tape recorder in a recording operational state, a reproducing operation member in the region of said recording operation member for placing the tape recorder in a reproducing operational state, a stop operation member for releasing the tape recorder from the operational states effected by said recording and said reproducing operation members, each of said recording, said reproducing and said stop operation members being movable in a certain direction, and an engaging member which is movable in a direction transverse to said certain direction for engaging said recording operation member to prevent said recording operation member from being operated when said reproducing operation member is operated and said engaging member is in a lock position, and for allowing said recording operation member to be operated when said reproducing operation member is operated and said engaging member is in either one of a recording position and a follow-up recording position.

2. An operation mechanism according to claim 1, wherein said recording operation member has an engaging piece thereon and said engaging member has first and second recesses therein and an engaging part intermediate said first and second recesses for contacting said engaging piece of said recording operation member when said engaging member is in said lock position, wherein said engaging piece is located in said first recess when said engaging member is in said recording position and said recording operation member is operated, and said engaging piece is located in said second recess when said engaging member is in said follow-up recording position and said recording operation member is operated.

3. An operation mechanism according to claim 1, including stopper means for holding said engaging member at said follow-up recording position, and release means associated with said stop operation member for cooperating with said stopper means to release said engaging member from said follow-up recording position.

* * * * *